United States Patent [19]

Hutchings et al.

[11] Patent Number: 4,818,109
[45] Date of Patent: Apr. 4, 1989

[54] FIBER OPTICAL COMBINER PARTICULARLY FOR A RING LASER GYRO

[75] Inventors: Thomas J. Hutchings, Canoga Park; George A. Pavlath, Thousand Oaks, both of Calif.

[73] Assignee: Litton Systems, Inc., Beverly Hills, Calif.

[21] Appl. No.: 916,152

[22] Filed: Oct. 7, 1986

Related U.S. Application Data

[63] Continuation-in-part of Ser. No. 750,416, Jun. 28, 1985, abandoned.

[51] Int. Cl.⁴ .................................................. G01C 19/64
[52] U.S. Cl. .................................................. 356/350
[58] Field of Search ...................... 356/350; 350/96.15

[56] References Cited

U.S. PATENT DOCUMENTS 4,444,502  4/1984  Ljung ................................. 356/350

OTHER PUBLICATIONS

Sheem et al., "Single-Mode Fiber Wavelength Multiplexer", Journal of Applied Physics, 8-1980.
Sheem, "Optical Fiber Interferometers with [3×3] Directional Couplers: Analysis", Journal of Applied Physics, 6-1981.

Primary Examiner—Davis L. Willis
Assistant Examiner—S. A. Turner
Attorney, Agent, or Firm—Roy L. Brown

[57] ABSTRACT

Apparatus for producing a three phase signal from two or three optical beams at different optical frequencies, such signal having a frequency equal to the difference frequency or frequencies between the optical frequencies of said beams including, preferably, an equal energy single mode fiber optic coupler and optical focusing means, such as gradient index rods, for directing said light beams onto light conducting fibers, preferably single mode fibers, thence through the coupler, thence onto light detectors to produce a substantially balanced three phase electrical signal at said difference frequency or frequencies.

In a preferred embodiment, the light beams are two in number, connected to only two input ports of said coupler, and the light beam sources are the output beams of counter- propagating ring laser beams in a ring laser gyro.

33 Claims, 2 Drawing Sheets

FIBER OPTICAL COMBINER PARTICULARLY FOR A RING LASER GYRO This is a continuation-in-part of U.S. patent application Ser. No. 06/750,416 now abandoned which was filed June 28, 1985 by Thomas J. Hutchings for a, "Optical Combiner For Ring Laser Gyro."

This application is in Class-Subclass 356-350.000, and it is examined in Group Art Unit 255.

Background of the Invention

In ring laser gyroscopes, one usually uses corner mirrors to reflect the ring laser beams. One of the mirrors is usually partly transmissive to allow the counterpropagating beams to be extracted from the ring laser. At the transmissive mirror, it is typical to attach prisms and mirrors which must be accurately aligned to cause the two counterpropagating beams to have the same path length and to impinge upon the same beam sensor. The beam sensor then produces electrical signals which are usually substantially sinusoidal signals at the frequency difference between the two optical frequencies of the two-counter-propagating beams. The frequency count is then a measure of the angular velocity of the ring laser gyroscope.

One trend in ring laser gyros is to extract the light from the gyro through single mode fiber optics to a combiner where the signals are combined in usable form to generate a signal that is a measure of the difference in optical frequency of the two counterpropagating ring laser rays, and hence of the angular velocity of the ring laser. Such prior art apparatus is shown, for example, in U.S. Pat. No. 4,444,502 and in FIG. 1 of this application.

A beam combiner for combining the counterpropagating laser beams from the single mode fibers in ring laser gyros is shown in FIGS. 5 and 6 of the patent.

BRIEF DESCRIPTION OF THE INVENTION

The apparatus of the invention extracts light from the two counterpropagating laser beams through two gradient index rods which focus the two onto the center of two single mode fibers of substantially equal length. The two single mode fibers are connected into two input ports of a single mode fiber optical coupler.

In a preferred embodiment, the single mode coupler is a 3×3 coupler having three optical input ports and three optical output ports. Three output single mode fibers are connected to the three output ports. The coupler is preferably one which divides the energy equally between the three output single mode fibers, and the output signal mode fibers carry light having light components of both frequencies container therein. Each single mode fiber is connected to a separate light sensor which filters out the light signals and converts the difference signals into three equal-energy signals, phased substantially one hundred and twenty degrees apart, at the difference frequency between the light frequencies of the two counterpropagating laser beams. Consequently, the outputs of the detectors are a three phase signal at a difference frequency which is a measure of the angular velocity which is being measured by the ring laser gyro. The apparatus of the invention has the advantages of not requiring the precise alignment of the prior art device, including that of the above-mentioned patent. Further, with the prior art sinusoidal single phase output signal, a particular degree of resolution occurs. The apparatus of a preferred embodiment of this invention, because of the three phase output signal, also produces three times as many zero crossings, and hence three times the resolution, for a given frequency difference between the counterpropagating laser beams.

It is therefore an object of this invention to produce three phased signals at the difference frequency of a ring laser gyro.

It is also an object of this invention to provide an n×m evanescent coupler to produce multiphase signals of different phases at the difference frequency of a ring laser.

It is a more specific object of the invention to achieve the other objects using equal energy couplers.

It is still a more specific object of the invention to achieve the other objects using single mode fiber optical couplers.

It is a more specific object of this invention to produce a substantially balanced three phase signal which is at the difference frequency of a ring laser gyro.

It is still a more specific objective of this invention to use a single mode fiber optical coupler to distribute light energy from two counterpropagating ring laser beams into three beams, the three beams being connected to three photosensors to produce a three phase signal at the difference frequency between the two counterpropagating beams of the ring laser.

It is another object of the invention to use an equal energy 3×3 coupler connected by two or three of its input ports to light sources to receive lights of different optical frequencies, and to connect three photodetectors to its output ports to generate substantially balanced three phase electrical signals at all of the difference frequencies of said light sources.

Other objects will become apparent from the following description, taken together with the accompanying description.

DESCRIPTION OF THE PREFERRED EMBODIMENT

Figure 1:
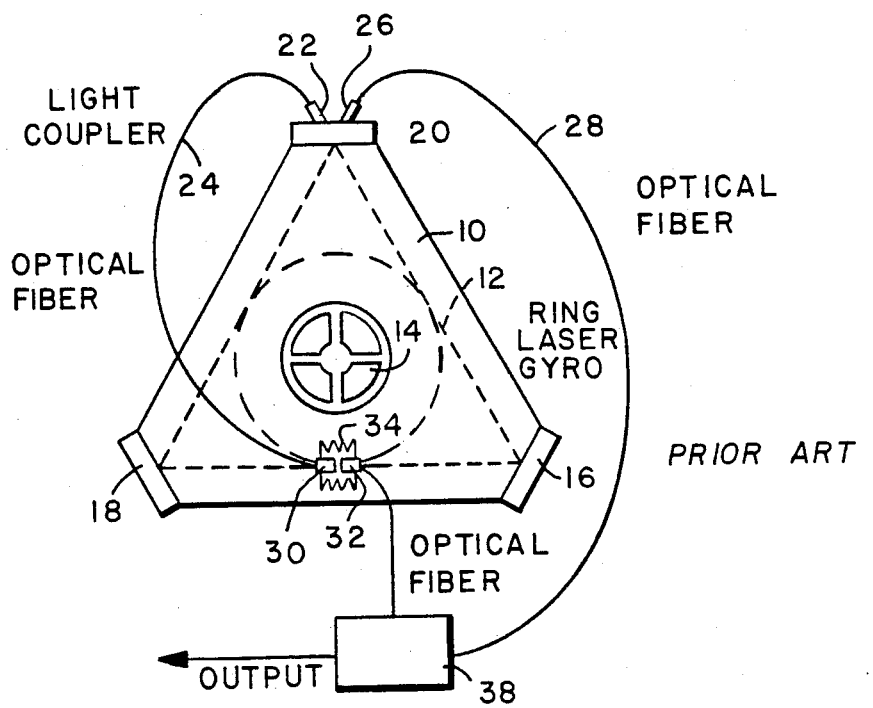
FIG. 1 drawing of a prior art ring laser gyro using two gradient index rods to extract light from the counterpropagating laser beams of the ring laser.
Figure 2:
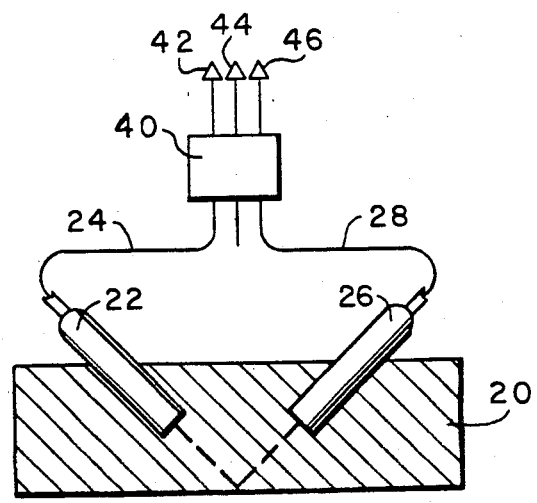
FIG. 2 is a view, partly in section, showing two gradient index rods positioned to intercept light from the counter-propagating ring laser beams and to deliver such light through a symmetric single mode fiber-optic path to single mode fiber optic coupler and thence a three light detector.
Figure 3:
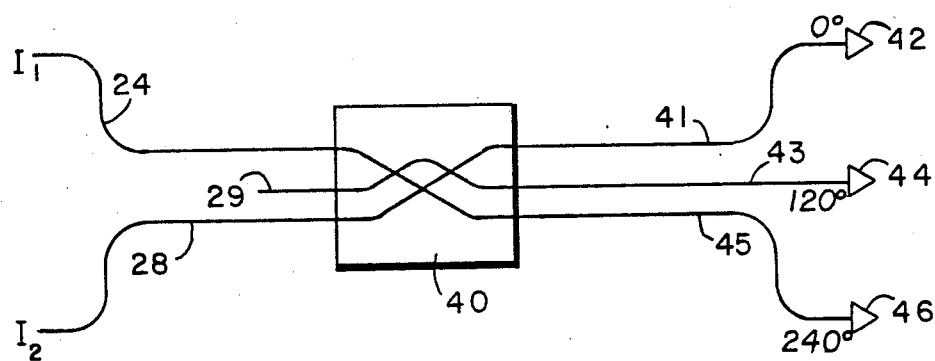
FIG. 3, is a schematic diagram of a typical single mode fiber optical coupler connected as in this invention.

FIG. 1 shows a typical three-branched ring laser gyro according to U.S. Pat. No. 4,444,502. A ring laser body 10 has therein a conduit for supporting a ring laser path 12. The body is preferably rigid, and it is usually of glass-ceramic material. The body 10 is typically supported for angular mechanical dithering upon a set of flexure springs 14. The mirrors 16, 18 and 20 define the optical path of the gyro, and the mirror 20 is shown partly transparent so that a portion of each of the counterpropagating beams is directed to a separate gradient index rod 22 or 26.

The rods 22 and 26 are preferably identical, and they are attached into the mirror block 20 by an optically transparent adhesive which minimizes optical reflections at the interface. The rods 22 and 26 focus their received light onto their axis and hence onto the axis of the attached single mode fibers 24 and 28. The single mode fibers 24 and 28 can be attached onto the end of the rods 22 and 26 with an optically transparent adhesive.

The lengths of the single mode fibers 24 and 28 are preferably substantially equal, and they are connected to two of the input single mode fibers of the single mode fiber optical coupler 40. The output optical single mode fibers connect the coupler 40 to the three light sensors 42, 44, and 46.

The coupler is called a 3×3 single mode fiber optical coupler, and it preferably is an equal energy coupler wherein all of the incoming light is coupled from each single mode fiber into the other single mode fibers. A coupler which splits the energy equally in one labeled T-7270 manufactured by the Electro-Optical Products Division of the ITT Corporation at 7635 Plantation Road, Roanoke, Va. 24019. The theory for such couplers is described in:

"Optical Fiber Interferometers with 3×3 Directional Couplers Analysis" by S. K. Sheem, Journal of Applied, Physics, Volume 52, page 3865, (1981).

"Optical Techniques to Solve the Signal Fading Problem in Fiber Interferometers" by S. K. Sheem, T. G. Gialorenzi, and K. P. Koo, Applied Physics, Volume 21, page 689 (1982).

The apparatus of the invention operates without exact equal energy distribution, and the phases between the signals are altered by a change in energy distribution. Equal energy distribution and a three phase signal are preferred.

Typical equal energy distribution couplers have the three mode fibers in physical contact, perhaps side by side or intertwined so that light from each single mode fiber mixes with the light introduced from the other single mode fibers. The fibers within an equal energy coupler are positioned so that their cross section would show them positioned in a touching equilateral triangle configuration. This would be the geometry regardless of whether the fibers were side by side or intertwined.

Unequal attentuation of the different fibers within the coupler would also cause unequal energy distribution and unpredictable phase shift.

Although single mode fibers are specified herein, the invention functions with reduced efficiency when the fibers 24 and 28 are multimode fibers and the coupler 40 is still made from single mode fibers.

A 2×2 coupler could not be used efficiently because, although a single phase signal would be produced, there would be no indication of the polarity of the sensed rotation.

It would be difficult to use any other n×n coupler than a 3×3 coupler because the distance between centers of the fibers in the coupler would not all be equal, there would be unequal energy distribution, and it would produce unpredictable phase shifts. It is, however, intended that this patent application shall include the use of n×n and n×m couplers.

It is the inventors' intention that this invention should also include the basic concept of producing a substantially balanced set of three phase signals at all of the difference frequencies between individual pairs of light beams connected to the input ports of an equal energy distribution 3×3 coupler.

With the three output ports of the 3×3 coupler illuminating three photosensors, a three phase signal is produced between the electrical output terminals of the three photosensors at each of the difference frequencies between light sources connected to the coupler's input ports.

With only two light beams, of different optical frequencies, connected to only two of the input ports, a substantially balanced three phase signal is produced, at the photosensors, having a frequency equal to the difference frequency between the two light beams.

With three light beams, of different optical frequencies, connected to three input ports, three substantially balanced three phase signals are produced, at the photosensors, having three frequencies equal to the difference frequencies between the three light beams.

Although the invention has been described in detail above, it is not intended that the invention shall be limited by that description, but only by the description taken together with the appended claims.

What is claimed:

1. In a ring laser, including means for transmitting rays of the counterpropagating laser beams out of said laser, the improvement comprising;

A body of light-transmissive rigid material attached to said laser to intercept said rays;

first and second light-focusing means each having an optically transmissive single mode fiber attached to one end thereof, each said light focusing means being configured to focus received rays onto the axis of its attached single mode fiber;

said body having passages therein, aligned relative to said rays, to receive said light focusing means and said rays, and positioned and directed to cause said rays to be delivered into the axes, respectively, of said single mode fibers;

a 3×3 single mode fiber optical coupler connected to receive said single mode fibers from said lenses and having a third single mode fiber therein, said single mode fibers being geometrically positioned within said coupler to deliver light to each other and to said third single mode fiber;

three light detectors connected to said three single mode fibers from said coupler, respectively, to produce electrical signals at a frequency which is equal to the difference in optical frequency between said counterpropagating laser signals.

2. Apparatus as recited in claim in which said light focusing means comprises a pair of gradient index rods.

3. Apparatus as recited in claim 2 in which said gradient index rods are connected on one end to said first and second single mode fibers, respectively, and said index rods are configured to focus received light onto the axes of said first and second optical fibers, respectively.

4. Apparatus as recited in claim 3 in which said first and second single mode fibers are substantially equal in length.

5. Apparatus as recited in claim 4 in which said optical coupler is an equal energy distribution optical coupler.

6. Apparatus as recited in claim 5 in which said optical detectors are square law detectors and are also optical filters to reject signals at optical frequencies and to transduce optical to electrical signals at the difference frequency between the optical signals on said first and second optical single mode fibers and at phase differences of substantially one hundred and twenty degrees.

7. In combination:

a ring laser angular rate sensor having counterpropagating laser beams, including means for extracting rays of said counterpropagating laser beams from said laser;

Light-transmissive means intercepting said extracted rays;

first and second light-focusing means, having first and second optically transmissive fibers attached, respectively, to one end of said light-focusing means, respectively, each said light focusing means being configured to focus received rays onto the axis of its said attached fiber;

said light transmissive means having passages formed therein to receive said light focusing means and said extracted rays;

said light passages and said light-focusing means being aligned, positioned and directed to cause said extracted rays to be delivered into the axes, respectively, of said first and second fibers;

a 3×3 single mode fiber optical coupler connected by two of its input ports to receive said first and second fibers and having three single mode fibers therein, said single mode fibers being geometrically positioned within said coupler to deliver light to each other and to said third single mode fiber;

three light detectors connected to receive light from the output ports of said coupler, respectively, to produce three-phase electrical signals at a frequency which is equal to the difference in optical frequency between said counterpropagating laser signals.

8. Apparatus as recited in claim 7 in which said light focusing means each comprises a graded index rod.

9. Apparatus as recited in claim 8 in which said fibers connected between said light focusing means and input ports of said coupler are single mode fibers of substantially equal length and attenuation.

10. Apparatus as recited in claim 9 in which said coupler is an equal energy coupler.

11. Apparatus as recited in claim 10 in which said single mode fibers within said coupler are substantially identical and are geometrically positioned with their centers equi-distant from each other 12. Apparatus as recited in claim 11 in which said detectors are square law detectors and further comprising third, fourth and fifth optically transmissive fibers connected between said output ports and said light detectors.

13. In combination:
not less than two nor more than three light sources of different optical frequencies;
a plurality of light-focusing means, equal in number to said light sources;
a plurality of optically transmissive fibers, equal in number and each attached by one end to a different one of said light-focusing means, respectively, each said light focusing means being configured to focus received rays onto the axis of its said attached fiber;
a 3×3 fiber optical coupler connected by its input ports to receive said fibers, no more than one fiber to each said input port, said coupler having optical fibers therein, said optical fibers being geometrically positioned within said coupler to deliver light to the other said optical fibers for equal energy distribution of the light among said fibers, therein;
three light detectors, connected by three substantially identical optical fibers to the output ports on said coupler;
whereby substantially balanced three phase signals are created between the outputs of said light detectors at frequencies equal to the difference frequencies between said light sources.

14. Apparatus as recited in claim 13 in which said light focusing means each comprises a graded index rod.

15. Apparatus as recited in claim 14 in which said fibers connected between said light focusing means and said input ports of said coupler are single mode fibers of substantially equal length and attenuation.

16. Apparatus as recited in claim 15 in which said coupler is a single mode equal energy coupler.

17. Apparatus as recited in claim 16 in which said single mode fibers within said coupler are substantially identical and are geometrically positioned with their centers equi-distant from each other.

18. Apparatus as recited in claim 17 in which said optically transmissive fibers between said output ports of said coupler and said light detectors are single mode fibers.

19. Apparatus as recited in claim 18 in which said light detectors are square law detectors and are also optical filters to reject signals at optical frequencies and to transduce optical to electrical signals at the difference frequency between the optical signals on said first and second optical single mode fibers and at phase differences of substantially one hundred and twenty degrees.

20. In combination:
a ring laser, including light transmitting means for transmitting rays of the counterpropagating laser beams out of said laser;
a body of light-transmissive rigid material attached to said laser to intercept and re-transmit said rays;
an n×m port evanescent optical coupler connected to receive said re-transmitted rays; and
q light detectors, where q is at least two, m is at least three, and q is less than m, connected to receive mixed light rays from q output ports of said coupler, respectively, to produce electrical signals at a frequency which is equal to the difference in optical frequency between said counterpropagating laser signals.

21. The combination of claim 20 and further comprising:
first and second light-focusing means each having an optically transmissive fiber attached to one end thereof, each said light focusing means being configured to focus received rays onto the axis of its said attached optical fiber;
said body has passages therein, aligned relative to said rays, to receive said light focusing means and said rays, and is positioned and is directed to cause said rays to be delivered into the axes, respectively, of said optical fibers;
said evanescent coupler is a fiber-optical coupler, having m single mode fibers, with two said fibers connected to receive said optical fibers from said lenses, said single mode fibers being geometrically positioned within said coupler to deliver light to each other.

22. The combination of claim 21 and further comprising:
q optical fibers, connected between the output ports of said coupler, respectively, and said light detectors to produce electrical signals, with different phases, at a frequency which is equal to the difference in optical frequency between said counterpropagating laser signals.

23. Apparatus as recited in claim 22 in which said light focusing means are gradient index rods that are connected on one end to said first and second optical fibers, respectively, and said index rods are configured to focus received light onto the axes of said first and second optical fibers, respectively.

24. Apparatus as recited in claim 23 in which said first and second optical fibers are single mode fibers that are substantially equal in length.

25. Apparatus as recited in claim 24 in which said optical coupler is an equal energy distribution optical coupler.

26. Apparatus as recited in claim 25 in which said light detectors are square law detectors and are also optical filters to reject signals at optical frequencies and to transduce optical to electrical signals at the difference frequency between the optical signals on said first and second optical single mode fibers.

27. In combination:
light ray producing means for producing p multiple frequencies of light
a body of light-transmissive rigid material attached to said producing means to receive, intercept and re-transmit said rays;
an n×m port evanescent optical coupler connected to receive said re-transmitted rays; and
q light detectors having a predetermined and known phase relation to each other, where p is at least two, q is at least two, m is at least three, p is less than or equal to q, and q is less than m, connected to receive mixed light rays from q output ports of said coupler, respectively, to produce electrical signals at a frequency which is equal to the difference in optical frequency between said light rays.

28. The combination of claim 27 and further comprising:
p light-focusing means each having an optically transmissive fiber attached to one end thereof, each said light focusing means being configured to focus received rays onto the axis of its said attached optical fiber;
said body has passages therein, aligned to said rays, to receive said light focusing means and said rays, and is positioned and is directed to cause said rays to be delivered into the axes, respectively, of said optical fibers;
said evanescent coupler is a fiber-optical coupler, having m single mode fibers, with two said fibers connected to receive said optical fibers from said lenses, said single mode fibers being geometrically positioned within said coupler to deliver light to each other.

29. The combination of claim 28 and further comprising:
q optical fibers, connected between the output ports of said coupler, respectively, and said light detectors to produce electrical signals, with different phases, at a frequency which is equal to the differences in optical frequencies among said rays.

30. Apparatus as recited in claim 29 in which said light focusing means are gradient index rods that are connected on one end to said first and second optical fibers, respectively, and said index rods are configured to focus received light onto the axes of said first and second optical fibers, respectively.

31. Apparatus as recited in claim 30 in which said p rays delivered to said p optical fibers connected to the input ports of said coupler are laser beams and said fibers are single mode fibers that are substantially equal in length.

32. Apparatus as recited in claim 31 in which said optical coupler is an equal energy distribution optical coupler.

33. Apparatus as recited in Claim 32 in which said light detectors are square law detectors and are also optical filters to reject signals at optical frequencies and to transduce optical to electrical signals at the difference frequencies among the optical signals onto said p fibers.

* * * * *